United States Patent

Ohwa et al.

Patent Number: 5,427,715
Date of Patent: Jun. 27, 1995

[54] ELECTRICALLY CONDUCTIVE PLASTICS COMPOSITIONS AND THE USE THEREOF

[75] Inventors: Masaki Ohwa, Kobe, Japan; Jürgen Finter, Freiburg, Germany; Wolfgang Wernet, Kobe, Japan

[73] Assignee: Ciba-Geigy Corporation, Ardsley, N.Y.

[21] Appl. No.: 45,456

[22] Filed: Apr. 8, 1993

[30] Foreign Application Priority Data

Apr. 15, 1992 [CH] Switzerland ............ 1248/92

[51] Int. Cl.$^6$ ............................................. H01B 1/00
[52] U.S. Cl. ............................ 252/500; 528/327; 528/373; 528/377; 528/378; 528/422
[58] Field of Search ............... 252/500, 518; 528/327, 528/373, 377, 378, 422

[56] References Cited

U.S. PATENT DOCUMENTS

| | | | |
|---|---|---|---|
| 4,087,391 | 5/1978 | Quentin | 204/296 |
| 4,880,508 | 11/1989 | Aldissi | 204/59 |
| 5,061,401 | 10/1991 | Wernet et al. | 252/500 |
| 5,159,031 | 10/1992 | Epstein et al. | 525/540 |
| 5,188,766 | 2/1993 | Eiffler | 252/500 |
| 5,206,297 | 4/1993 | Wernet et al. | 525/279 |

FOREIGN PATENT DOCUMENTS

| | | |
|---|---|---|
| 099531 | 2/1984 | European Pat. Off. |
| 1047264 | 4/1984 | European Pat. Off. |
| 0303360 | 2/1989 | European Pat. Off. |
| 358188 | 3/1990 | European Pat. Off. |
| 1584814 | 1/1970 | France |
| 3-59004 | 3/1991 | Japan |
| 2124635 | 2/1984 | United Kingdom |
| 9218988 | 10/1992 | WIPO |

OTHER PUBLICATIONS

Gieselman et al, Macromolecules, 23, 3118–3124 (1990).

*Primary Examiner*—Paul Lieberman
*Assistant Examiner*—M. Kopec
*Attorney, Agent, or Firm*—George R. Dohmann

[57] ABSTRACT

A composition comprising a) at least one polyheteroaromatic compound or one polyaniline in oxidized, polycationic form, and b) at least one polyanion of a film-forming thermoplastic polymer having sulfonate-alkylated alcohol groups

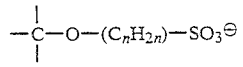

in structural repeating units, wherein the group —($C_nH_{2n}$)— is linear or branched $C_2$–$C_{12}$-alkylene that has from 2 to 5 carbon atoms in the carbon chain and is unsubstituted or substituted by $C_1$–$C_4$alkoxy. The composition is electrically conductive and can be processed thermoplastically. It can be used in the production of moulded articles or in the form of powders as a filler for plastics.

36 Claims, No Drawings

ELECTRICALLY CONDUCTIVE PLASTICS COMPOSITIONS AND THE USE THEREOF

The invention relates to compositions comprising a) at least one oxidised polycationic polyheteroaromatic compound or at least one polyaniline and b) at least one polyanion of a thermoplastic polymer having sulfonate-alkylated alcohol groups

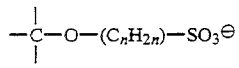

in structural repeating units, to processes for the preparation of the compositions, to the use of the compositions in the production of electrically conductive moulded articles and to the use of fine-particled electrically conductive compositions as fillers for plastics.

It is known that the electrochemical polymerisation of heteroaromatic compounds, especially pyrrole, in the presence of non-nucleophilic anions yields electrically conductive salts of polycationic polyheteroaromatic compounds. The mechanical, and often also electrical, properties of such salts of polyheteroaromatic compounds, which are generally deposited on anodes in the form of a film, are not adequate for many uses.

GB-A-2 124 635 describes compositions comprising polyanionic polymers having sulfonate groups in structural repeating units and polycationic polyheteroaromatic compounds or polyanilines that have good electrical properties but inadequate mechanical properties. The resulting products are accordingly characterised as tough and flexible, but brittle, and they cannot be processed in accordance with thermoplastic moulding processes.

M. B. Gieselmann et al. describe in Macromolecules 23, pages 3118 to 3124 (1990), compositions comprising polycationic polypyrrole and a polyanionic N-sulfonatealkylated poly(p-phenylene)terephthalic acid amide. Only moderate conductivities with an improved thermal stability are achieved, but the materials are also characterised as brittle and cannot be processed thermoplastically.

U.S. Pat. No. 5,061,401 discloses compositions comprising cationic polyheteroaromatic compounds or polyanilines and polymeric sulfates as polyanions, which compositions are thermoplastically deformable and have outstanding mechanical properties and electrical properties. The sulfate group is bonded directly to the hydroxy group of structural repeating units of the thermoplastic polymers. Those compositions are regarded as having the disadvantage that the electrical conductivity depends on the molecular weight of the polyanions, which makes it difficult to produce products having reproducible properties.

It has now been found that polymers having sulfonate-alkylated hydroxy groups are outstandingly suitable as polyanions in the preparation of electrically conductive compositions comprising polycationic polyheteroaromatic compounds or polyanilines, which compositions have surprisingly high electrical conductivities that do not depend on the molecular weight of the anionic polymers and that can unexpectedly be substantially further increased by stretching. The compositions can also be processed thermoplastically and have outstanding mechanical properties, such as, for example, a high tensile strength and flexural elongation. Certain mechanical properties, such as, for example, resistance to tearing, can be substantially further improved by stretching.

The invention relates to a composition comprising a) at least one polyheteroaromatic compound or one polyaniline in oxidised, polycationic form, and b) at least one polyanion of a film-forming thermoplastic polymer having sulfonate-alkylated alcohol groups

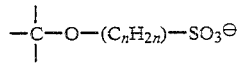

in structural repeating units, wherein the group —$(C_nH_{2n})$— is linear or branched $C_2$–$C_{12}$alkylene that has from 2 to 5 carbon atoms in the carbon chain and is unsubstituted or substituted by $C_1$–$C_4$alkoxy.

Within the scope of this invention, polyheteroaromatic compounds are to be understood as being homo- and co-polymers that comprise heteroaromatic structural repeating units. They may have a relatively high molecular weight or may also be oligomeric if they are solid at room temperature and are able to form films. Preferred are polyheteroaromatic compounds comprising 5- or 6-membered rings that contain from 1 to 3 hetero atoms, preferably 1 hetero atom, from the group —O—, —S— and —N—, and the carbon atoms of which are unsubstituted or substituted by $C_1$–$C_{16}$alkyl, especially $C_1$–$C_{12}$alkyl. Preferably, 2 carbon atoms are not substituted, so that the electrochemical or chemical polymerisation can be carried out. The 5- or 6-membered ring is preferably selected from the group consisting of pyrrole, thiophene, furan, 2,2'-bipyrrole, 2,2'-pithiophene, 2,2'-bifuran, thiazole, oxazole, thiadiazole and imidazole.

The polyheteroaromatic compound is especially preferably formed from a pyrrole of the formula

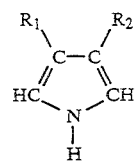

wherein each of $R_1$ and $R_2$, independently of the other, is H, $C_1$–$C_{16}$alkyl or $C_1$–$C_6$alkoxy, or $R_1$ and $R_2$ together are tri- or tetra-methylene. $R_1$ and $R_2$ may be, for example, $C_1$–$C_{12}$-alkyl or $C_1$–$C_{12}$alkoxy, such as, for example, methyl, methoxy, ethyl or ethoxy, and are especially H. The NH group of the pyrrole may be substituted by $C_1$–$C_{12}$alkyl, especially $C_1$–$C_6$alkyl. $R_1$ and $R_2$ together may also be tri- or tetra-methylene. Pyrrole is especially preferred.

Suitable anilines are, for example, aniline itself and aniline substituted in the 3-position by $C_1$–$C_6$alkyl or $C_1$–$C_{12}$alkoxy, preferably $C_1$–$C_6$alkyl or $C_1$–$C_6$alkoxy.

The composition according to the invention comprises, per structural unit of the polyheteroaromatic compound, preferably from 0.1 to 0.9, especially preferably from 0.1 to 0.6, more especially preferably from 0.15 to 0.4, structural units having sulfonatealkylated alcohol groups

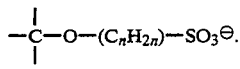

The group —($C_nH_{2n}$)— is preferably linear or branched $C_3$–$C_8$alkylene having from 3 to 5 carbon atoms in the carbon chain and is especially preferably linear $C_3$–$C_5$alkylene. Some examples are ethylene, methylethylene, dimethylethylene, 1,3-propylene, methyl-1,3-propylene, dimethyl-1,3-propylene, trimethyl-1,3-propylene, 1,4-butylene, methyl-1,4-butylene, dimethyl-1,4-butylene, trimethyl-1,4-butylene, tetramethyl-1,4-butylene, 1,3-or 1,5-pentylene and 1,3-, 1,4-, 1,5- or 1,6-hexylene. The group —($C_nH_{2n}$)— is especially trimethylene or tetramethylene.

The thermoplastic polymer used in the composition according to the invention and having salt-form sulfonate-alkylated alcohol groups

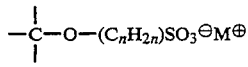

has a glass transition temperature of preferably from −100° to 350° C., especially preferably from −50° to 250 ° C., measured in accordance with the DSC method (Differential Scanning Calorimetry). $M^\oplus$ is an alkali metal cation or an ammonium cation, which will be described hereinafter in connection with the polymers.

The tensile strength of that thermoplastic polymer is preferably at least 5 MPa, especially preferably at least 10 MPa, measured in accordance with DIN 53 455. Depending on the type of polymer, the tensile strength may be up to 1000 MPa, preferably up to 500 MPa and especially preferably up to 300 MPa. The degree of polymerisation may be, for example, from 5 to 10 000, preferably from 10 to 5000 and especially preferably from 10 to 1000.

The ratio of free alcohol groups to sulfonate-alkylated alcohol groups

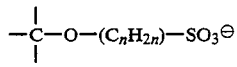

in the thermoplastic polymer may be, for example, from 50:1 to 1:50, preferably from 10:1 to 1:10.

The sulfonate-alkylated alcohol groups may be bonded in the form of secondary groups

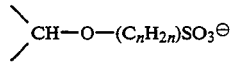

or tertiary groups

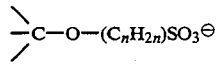

in the polymer backbone; or they may be bonded in side groups of the polymer in the form of primary groups —$CH_2$—O—($C_nH_{2n}$)$SO_3^\ominus$ in the terminal position, or in the form of secondary groups

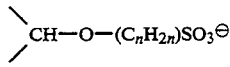

or in the form of tertiary groups

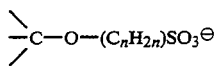

in the middle position.

The thermoplastic polymers may be based on polymers containing different hydroxy groups or on mixtures thereof, for example polyesters, polyester amides, polyurethanes, polyamides, polycarbonates and polyimides of monomers containing hydroxy groups; hydrolysed polymers of vinyl esters or vinyl ethers; hydroxylated polydiolefins, such as, for example, polybutadiene, polyisoprene or chloroprene and also copolymers with olefinic monomers; polyacrylates or polymethacrylates having hydroxyalkyl radicals in the ester group; polysiloxanes having hydroxyalkyl groups; or reduced polyketones or co-polymers thereof; polyethers of glycidyl compounds and diols; polyvinylphenols or copolymers of vinylphenol and olefinic comonomers; and also copolymers of vinyl alcohol, or of acrylates or methacrylates containing hydroxyalkyl, or of hydroxylated diolefins with ethylenically unsaturated comonomers, such as, for example, acrylonitrile, olefins, diolefins, vinyl chloride, vinylidene chloride, vinyl fluoride, vinylidene fluoride, styrene, α-methylstyrene, maleic acid anhydride, maleic acid imide, vinyl ethers and vinyl esters.

The sulfonate-alkylated thermoplastic polymers are based preferably on polymers selected from the group consisting of polyadducts of glycidyl compounds having an average of more than one epoxy group and a diol; homo- and co-polymers of hydroxyalkyl acrylates or methacrylates; homo- and co-polymers of vinyl alcohol; homo- and co-polymers of butadiene, isoprene and chloroprene, the double bonds of which are partially or completely hydroxylated; polyimides of hydrogenated ketotetracarboxylic acids, especially benzophenonetetracarboxylic acids; hydroxyalkylpolysiloxanes; and polyesters, polyamides, polyurethanes and polyimides of $C_4$–$C_{12}$alkenylene-diols or-diamines, the double bond of which is hydroxylated.

The thermoplastic polymer may be, for example, an at least partially sulfonate-alkylated polyadduct of a) a glycidyl compound having an average of more than one epoxy group and b) a diol, which polyadduct comprises groups

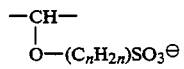

in the polymer chain, wherein the group —$C_nH_{2n}$— has the meanings given above, including the preferred meanings.

The polyadducts are based preferably on glycidyl compounds having an average of two epoxy groups in the molecule.

Suitable glycidyl compounds are especially those having two glycidyl groups, β-methylglycidyl groups or 2,3-epoxycyclopentyl groups bonded to a hetero atom (for example sulfur, preferably oxygen or nitrogen); there may be mentioned especially bis(2,3-epoxycyclopentyl) ether; diglycidyl ethers of polyhydric aliphatic alcohols, such as 1,4-butanediol, or polyalkylene glycols, such as polypropylene glycols; diglycidyl ethers of cycloaliphatic polyols, such as 2,2-bis(4-hydroxycyclohexyl)propane; diglycidyl ethers of polyhydric phenols, such as resorcinol, bis(p-hydroxyphenyl)methane, 2,2-bis(p-hydroxyphenyl)propane (=diomethane),2,2-bis(4'-hydroxy-3',5'-dibromophenyl)propane, 1,3-di-(p-hydroxyphenyl)ethane; di-(β-methylglycidyl) ethers of the above-mentioned dihydric alcohols or dihydric phenols; diglycidyl esters of dicarboxylic acids, such as phthalic acid, terephthalic acid, Δ4-tetrahydrophthalic acid and hexahydrophthalic acid; N,N-diglycidyl derivatives of primary amines and amides and heterocyclic nitrogen bases containing two nitrogen atoms, and N,N'-diglycidyl derivatives of disecondary diamides and diamines, such as N,N-diglycidylaniline, N,N-diglycidyltoluidine, N,N-diglycidyl-p-aminophenyl methyl ether, N,N'-dimethyl-N,N'-diglycidyl-bis(p-aminophenyl)methane; N',N''-diglycidyl-N-phenyl isocyanurate; N,N'-diglycidylethyleneurea; N,N'-diglycidyl-5,5-dimethylhydantoin, N,N'-diglycidyl-5-isopropylhydantoin,N,N-methylene-bis(N',N'-diglycidyl-5,5-dimethylhydantoin), 1,3-bis(N-glycidylhydantoin)-5,5-dimethylhydantoin)-2-hydroxypropane; N,N'-diglycidyl-5,5-dimethyl-6-isopropyl-5,6-dihydrouracil.

The glycidyl compounds may be reacted with aliphatic, cycloaliphatic or aromatic diols to form the preferred polyadducts, there being formed by addition to the glycidyl group a secondary alcohol group that can be sulfated.

The glycidyl compounds may, however, also be reacted with primary, aliphatic, cycloaliphatic or aromatic monoamines (for example aniline, toluidine, $C_1$–$C_{12}$alkylamines, $C_2$–$C_{12}$hydroxyalkylamines), aliphatic, cycloaliphatic or aromatic dicarboxylic acids (for example maleic acid, adipic acid, trimethyladipic acid, sebacic acid, azelaic acid, succinic acid, dodecylsuccinic acid, phthalic acid, terephthalic acid, Δ4-tetrahydrophthalic acid, hexahydrophthalic acid, 4-methylhexahydrophthalic acid, 3,6-endomethylene-Δ4-tetrahydrophthalic acid, 4-methyl-3,6-endomethylene-Δ4-tetrahydrophthalic acid) or aliphatic, cycloaliphatic, heterocyclic or aromatic bis-secondary amines or bis-secondary carboxylic acid amides (for example N,N'-dimethylethylenediamine, N,N'-dimethylpropylene-1,3-diamine, N,N'-dimethylhexamethylenediamine, N,N'-dicyclohexylhexamethylenediamine, N,N',N''-trimethyldiethylenetriamine, N,N'-diethylpropylene-1,3-diamine, N-methyl-3,5,5-trimethyl-3-(methylaminomethyl)-cyclohexylamine, N,N'-dimethylated or -diethylated aromatic diamines, for example m- or p-phenylenediamine, bis(4-aminophenyl)-methane or -sulfone, 2,2-bis(4-aminophenyl)propane, N,N-dimethyl-m-xylylenediamine, and also ethyleneurea, 5,5-dimethylhydantoin, 5-isopropylhydantoin, N,N-methylene-bis5,5-dimethylhydantoin, 1,3-bis(5,5-dimethyl)-2-hyroxypropane, 5,5-dimethyl-6-isopropyl-5,6-dihydrouracil), by polyaddition to form linear polyadducts.

Preferred is a composition according to the invention wherein the polyadduct comprises a) from 100 to 5 mol % of the same or different structural units of formula I

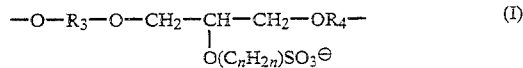

and b) from 95 to 0 mol % of the same or different structural units of formula II

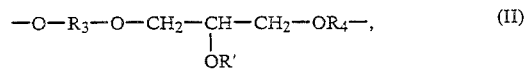

based on the polyadduct, wherein each of $R_3$ and $R_4$, independently of the other, is the radical, depleted of two hydroxy groups, of a diol having aliphatic or aromatic diol groups, and R' is H, $C_1$–$C_{20}$alkyl, $C_1$–$C_{20}$acyl, or aminocarbonyl N-substituted by a $C_1$–$C_{20}$hydrocarbon radical.

R' representing $C_1$–$C_{20}$alkyl may be linear or branched. R' representing acyl may be, for example, $C_1$–$C_{20}$alkyl-CO—, $C_5$–$C_8$cycloalkyl-CO—, $C_1$–$C_{15}$alkyl-$C_5$–$C_8$cycloalkyl-CO, $C_5$–$C_8$cycloalkyl-CH$_2$—CO—, $C_1$–$C_{14}$alkyl-$C_5$–$C_8$cycloalkyl-CH$_2$—CO, phenyl-CO, benzyl-CO, $C_1$–$C_{14}$alkyl-phenyl-CO— or -benzyl-CO—. The hydrocarbon carbon radical in the aminocarbonyl may be, for example, $C_1$–$C_{20}$alkyl, $C_5$–$C_8$cycloalkyl, $C_1$–$C_{15}$alkyl-$C_5$–$C_8$cycloalkyl, $C_5$–$C_8$cycloalkyl-CH$_2$—, $C_1$–$C_{14}$alkyl-$C_5$–$C_8$cycloalkyl-CH$_2$, phenyl, benzyl, $C_1$–$C_{14}$-alkyl-phenyl or benzyl. R' is preferably H.

The polyadduct comprises preferably from 90 to 10 mol %, especially preferably from 15 to 60 mol %, of structural units of formula I, and from 90 to 10 mol %, especially preferably from 85 to 40 mol %, of structural units of formula II.

In a preferred form, $R_3$ and $R_4$ are identical radicals. $R_3$ and $R_4$ representing radicals having aliphatic diol groups contain preferably from 2 to 12, especially from 2 to 8, carbon atoms. The hydroxy groups may be bonded to open-chain or cycloaliphatic radicals Suitable aliphatic radicals are, for example, linear or branched $C_2$–$C_{12}$alkylene, $C_3$–$C_8$-cycloalkylene, $C_1$–$C_4$alkyl-$C_5$–$C_8$cycloalkylene, cyclohexylmethylene or cyclohexyldimethylene. Examples are ethylene, 1,2- or 1,3-propylene, 1,2-, 1,3- or 1,4-butylene, 1,2-, 1,3-, 1,4- or 1,5-pentylene, 1,2-, 1,3-, 1,4-, 1,5- or 1,6-hexylene, heptylene, octylene, nonylene, decylene, undecylene, dodecylene, 1,3-cyclopentylene, 1,3- or 1,4-cyclohexylene, 2-methyl-1,4-cyclohexylene and cyclohexyl-1,4-dimethylene.

The aromatic diol groups of the diols used for the polyadducts are especially phenolic groups. The diol radicals having phenolic groups contain preferably from 6 to 30, especially preferably from 6 to 20, carbon atoms. A preferred form consists of compositions wherein each of $R_3$ and $R_4$, independently of the other, is a radical of formula III

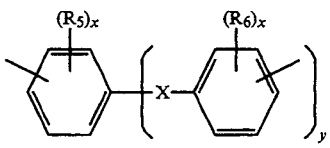

(III)

wherein

X is a direct bond, $C_1$–$C_4$alkylene, $C_2$–$C_{12}$alkylidene, $C_5$–$C_8$cycloalkylidene, —O—, —S—, —SO—, —SO$_2$—, —CO—, —CO$_2$—, —N($C_1$–$C_4$alkyl)— or —Si(CH$_3$)$_2$—, each of $R_5$ and $R_6$, independently of the other, is H, halogen, $C_1$–$C_4$alkyl or $C_1$–$C_4$alkoxy, and x is 1 or 2 and y is 0 or 1.

X is preferably a direct bond, methylene, ethylene, $C_2$–$C_6$alkylidene, cyclohexylidene or cyclopentylidene, —O— or —S—. Each of $R_5$ and $R_6$ is preferably H or methyl and y is preferably 1.

Each of $R_3$ and $R_4$ is especially the radical

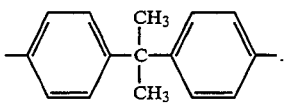

A further preferred form consists of compositions wherein the thermoplastic polymer is an at least partially sulfonate-alkylated polyvinyl alcohol or sulfonate-alkylated polyvinyl alcohol copolymer having groups

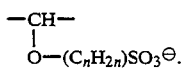

The composition comprises preferably sulfonate-alkylated polyvinyl alcohol copolymers.

Preferred are those compositions with polyvinyl alcohol copolymers wherein the copolymer comprises a) from 90 to 5 mol % of structural units of formula IV

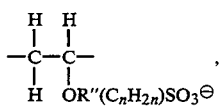 (IV)

and b) from 95 to 10 mol % of the same or different structural units of formula V

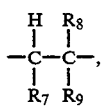 (V)

wherein $R_7$ is H, $C_1$–$C_6$alkyl, —COOR$_{10}$ or —COO$^\ominus$, $R_8$ is H, F, Cl, CN or $C_1$–$C_6$alkyl, and $R_9$ is H, OH, R"OH, F, Cl, CN, $R_{10}$—O—, $C_1$–$C_{12}$alkyl, —COO$^\ominus$, —COOR$_{10}$, —OCO—R$_{10}$, methylphenyl or phenyl, in which $R_{10}$ is $C_1$–$C_{18}$alkyl, $C_5$–$C_7$cycloalkyl, ($C_1$–$C_{12}$alkyl)-$C_5$–$C_7$cycloalkyl phenyl, ($C_1$–$C_{12}$-alkyl)phenyl, benzyl or ($C_1$–$C_{12}$alkyl)benzyl and R" is linear or branched $C_2$–$C_{18}$alkylene or poly($C_2$–$C_6$oxaalkylene) having from 2 to 6 oxaalkylene units.

The copolymer comprises preferably from 60 to 10 mol %, especially from 50 to 10 mol %, of structural units of formula IV, and from 40 to 90 mol %, especially from 50 to 90 mol %, of structural units of formula V.

R" representing alkylene contains preferably from 2 to 12, especially preferably from 2 to 8, and more especially preferably from 2 to 6, carbon atoms. Examples are ethylene and the isomers of propylene, butylene, pentylene, hexylene, heptylene, octylene, nonylene, decylene, undecylene, dodecylene, tetradecylene, hexadecylene and octadecylene. Preferred are ethylene, 1,2- and 1,3-propylene, 1,2-, 1,3- and 1,4-butylene, 1,2-, 1,3-, 1,4- and 1,5-pentylene and 1,2-, 1,3-, 1,4-, 1,5- and 1,6-hexylene.

R" representing poly(oxaalkylene) contains preferably from 2 to 4 oxaalkylene units, and preferably from 2 to 4, especially preferably 2 or 3, carbon atoms in the alkylene radical.

$R_7$ is preferably H. If $R_7$ is alkyl, then it is preferably methyl or ethyl. If $R_7$ is —COOR$_{10}$, then $R_{10}$ is preferably $C_1$–$C_{12}$alkyl, especially $C_1$–$C_6$alkyl.

If $R_8$ is alkyl, then it is preferably $C_1$–$C_4$alkyl, for example methyl, ethyl, n-propyl and n-butyl. $R_8$ is preferably H, Cl, or $C_1$–$C_4$alkyl.

If $R_9$ is the group $R_{10}$—O—, then $R_{10}$ is preferably $C_1$–$C_{12}$alkyl, especially $C_1$–$C_6$alkyl. If $R_9$ is alkyl, then it contains preferably from 1 to 6, especially from 1 to 4, carbon atoms. If $R_9$ is the group —COOR$_{10}$, then $R_{10}$ is preferably $C_1$–$C_{12}$alkyl, especially $C_1$–$C_6$alkyl, cyclopentyl or cyclohexyl. If $R_9$ is the group —OCO—R$_{10}$, then $R_{10}$ is preferably $C_1$–$C_{12}$alkyl, especially $C_1$–$C_6$alkyl, phenyl or benzyl.

In a preferred form, $R_7$ is H, $R_8$ is H, F, Cl, methyl or ethyl, and $R_9$ is H, OH, F, Cl, CN, $C_1$–$C_4$alkyl, $C_1$–$C_6$alkoxy, —COO—$C_1$–$C_6$alkyl, —OOC—$C_1$–$C_6$alkyl or phenyl.

Especially preferred are compositions wherein, in formula V, $R_7$ is H, $R_8$ is H or methyl, and $R_9$ is H, OH, CN, methyl, OCH$_3$ or —COOCH$_3$.

More especially preferred are compositions that comprise from 5 to 50 mol % of structural units of formula IV, from 95 to 50 mol % of structural units of the formula —CH$_2$—CH$_2$— and from 0 to 20 mol % of structural units of the formula —CH$_2$—CH(OH)—, the molar percentages making up 100 %.

A further preferred form consists of compositions wherein the thermoplastic polymer is a sulfonate-alkylated polymer of a partially hydroxylated polybutadiene, chloroprene or polyisoprene.

A preferred form consists of those compositions that comprise from 5 to 70 mol % of structural units of formula VI

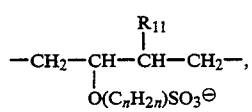 (VI)

and from 30 to 95 mol % of structural units of formula VIa,

 (VIa)

wherein $R_{11}$ is H, OH or Cl and the group —$C_nH_{2n}$— has the meaning given above, including the preferred meanings. Those polymers may comprise up to 65 mol % of structural units of formula V, the molar percentages making up 100 mol %.

This composition comprises preferably from 5 to 50 mol % of structural units of formula VI and from 50 to 95 mol % of structural units of formula VIa. $R_{11}$ is preferably H or Cl.

A further preferred form consists of compositions wherein the thermoplastic polymer is a sulfonate-alkylated polyimide having structural units of formula VII

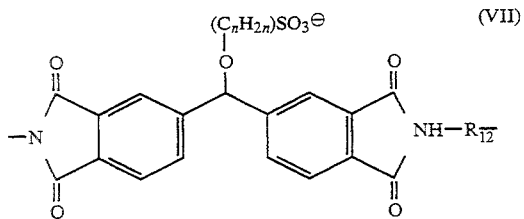

wherein $R_{12}$ is $C_6$–$C_{12}$arylene or $C_5$–$C_8$cycloalkylene each of which is unsubstituted or substituted by $C_1$–$C_6$alkyl or by $C_1$–$C_6$alkoxy, or is the radical

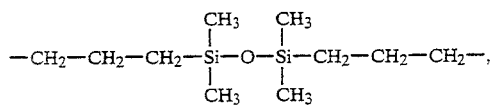

and the group —$C_nH_{2n}$— has the meaning given above, including the preferred meanings.

Another preferred form consists of compositions wherein the thermoplastic polymer is a sulfonate-alkylated polyamide having structural units of the formula VIII

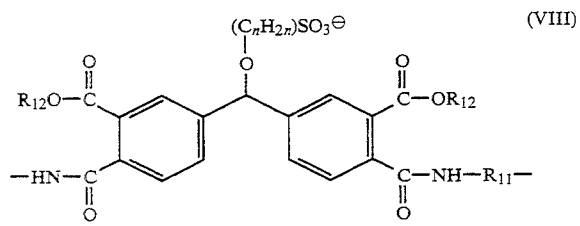

wherein
$R_{11}$ is $C_6C_{12}$arylene or $C_5$–$C_8$cycloalkylene each of which is unsubstituted or substituted by $C_1$–$C_6$alkyl or by $C_1$–$C_6$alkoxy, or is the radical

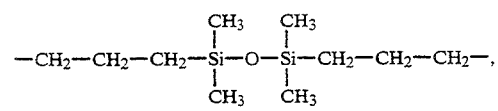

$R_{12}$ is $C_1$–$C_{12}$alkyl and the group —$C_nH_{2n}$— has the meaning given above, including the preferred meanings.

If the composition comprises more than one polyanion of a thermoplastic polymer having sulfonate-alkylated alcohol groups, then binary or ternary mixtures are preferred.

The polyanions of component b) in the composition according to the invention are derived from known polymeric salts or from polymeric salts that can be prepared in accordance with processes known per se. These polymeric salts are thermoplastic polymers having sulfonate-alkylated alcohol groups

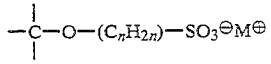

in structural repeating units, $M^{\oplus}$ being an alkali metal cation or an ammonium cation.

The ammonium cation may be, for example, $NH_4^{\oplus}$, a protonated, primary, secondary or tertiary amine, or quaternary ammonium or pyridinium. The primary ammonium may contain from 1 to 18, especially from 1 to 12 and more especially from 1 to 6, carbon atoms, the secondary ammonium may contain from 2 to 24, especially from 2 to 12 and more especially from 2 to 8, carbon atoms, the tertiary ammonium may contain from 3 to 30, especially from 3 to 18 and more especially from 3 to 12, carbon atoms, and the quaternary ammonium may contain from 4 to 36, especially from 4 to 24 and more especially from 4 to 18, carbon atoms.

Preferred polymeric salts are those wherein $M^{\oplus}$ is $Li^{\oplus}$, $Na^{\oplus}$ or $K^{\oplus}$, or $R_{13}R_{14}R_{15}R_{16}N^{\oplus}$ wherein each of $R^{13}$, $R^{14}$, $R^{15}$ and $R^{16}$, independently of the others, is H, $C_1$–$C_{18}$alkyl that is unsubstituted or hydroxy-substituted, phenyl, ($C_1$–$C_{12}$alkyl)phenyl, ($C_1C_{12}$alkyl)benzyl $C_5$–$C_7$cycloalkyl or ($C_1$–$C_{12}$alkyl)—$C_5$–$C_7$cycloalkyl, or $R_{13}$ $R_{14}$ together are tetramethylene, pentamethylene or 3-oxapentylene and $R_{15}$ and $R_{16}$ are as defined above. A preferred form consists of polymers wherein at least one of $R_{13}$ to $R_6$ is not H. Especially preferred are polymers wherein $R_{13}$ to $R_{15}$ are $C_1$–$C_6$alkyl and $R_{16}$ is H.

$R_{13}$ to $R_{16}$ representing alkyl may be linear or branched and contain preferably from 1 to 12, especially from 1 to 6, carbon atoms. Examples are methyl, ethyl, n- and iso-propyl, n-, iso- and tert-butyl, pentyl, hexyl, heptyl, octyl, nonyl, decyl, undecyl, dodecyl, tetradecyl, hexadecyl and octadecyl.

$R_{13}$ to $R_{16}$ representing hydroxyalkyl may be linear or branched, and they contain preferably from 2 to 18, especially from 2 to 12 and more especially from 2 to 6, carbon atoms. Some examples are 2-hydroxyeth-1-yl, 1- or 2-hydroxyprop-3-yl, 1-hydroxybut-4-yl and 1-hydroxyhex-6-yl.

Examples of alkylphenyl and alkylbenzyl are methylphenyl, dimethylphenyl, ethylphenyl, n- or iso-propylphenyl, n-, iso- or tert-butylphenyl, hexylphenyl, octylphenyl, decylphenyl, dodecylphenyl and correspondingly alkylated benzyl radicals.

$R_{13}$ to $R_{16}$ representing cycloalkyl are especially cyclopentyl or cyclohexyl.

$R_{13}$ to $R_{16}$ representing alkylcycloalkyl are preferably ($C_1$–$C_{12}$alkyl)-cyclopentyl or -cyclohexyl, for example methyl- or ethyl-cyclopentyl or -cyclohexyl.

$R_{13}$ to $R_{16}$ are especially preferably $C_1$–$C_6$alkyl.

The polymeric salts to be used according to the invention are known or can be prepared in accordance with generally known processes, and, depending on the type of polymer used and the process conditions, hydroxy groups in the monomers used may be protected by customary protecting groups. Polymers containing hydroxy groups have been widely described or can be obtained in accordance with known processes.

The thermoplastic polymeric salts to be used according to the invention are obtainable in known manner by reacting a thermoplastic polymer that comprises alcohol groups

in structural repeating units with a sultone of the formula

in the presence of an inert solvent and an alkali metal salt or an ammonium salt and then isolating the polymeric salt.

Suitable inert solvents are especially polar aprotic solvents, the choice of solvent being governed principally by the solubility of the polymers containing hydroxy groups. The solvents can be used alone or in a mixture of at least two solvents. Examples are: ethers, such as dibutyl ether, tetrahydrofuran, dioxane, methylene glycol, dimethylethylene glycol, dimethyldiethylene glycol, diethyldiethylene glycol, dimethyltriethylene glycol, and halogenated hydrocarbons, such as methylene chloride, chloroform, 1,2-dichloroethane, 1,1,1-trichloroethane, and 1,1,2,2-tetrachloroethane, carboxylic acid amides and lactams, such as N,N-dimethylformamide, N,N-diethylformamide, N,N-dimethylacetamide, N,N-diethylacetamide, N-methyl-γ-butyrolactam, N-methyl-ε-caprolactam, N-methylpyrrolidone, N-acetylpyrrolidone, tetramethylurea, and hexamethylphosphoric acid triamide, sulfoxides, such as dimethyl sulfoxide, sulfones, such as dimethylsulfone, diethylsulfone, trimethylenesulfone, and tetramethylenesulfone, N-methylpyrrolidine, N-methylpiperidine, N-methylmorpholine, substituted benzenes, such as benzonitrile, chlorobenzene, o-dichlorobenzene, 1,2,4-trichlorobenzene, and nitrobenzene.

The reaction temperature is, for example, from 40° to 200° C., preferably from 60 to 150° C. When the reaction is complete, the polymeric salt can be precipitated in a non-solvent, advantageously water, isolated by filtration, washed and dried.

Sulfonate-alkylated phenoxy resins are described, for example, in BE-B-847 353. Sulfonate-alkylated polyvinyl alcohols are described, for example, in EP-A-0 099 631 and in FR-B-1 584 814.

The polymeric salts, to be used according to the invention, of polymers containing sulfonate-alkylated hydroxy groups have thermoplastic properties. Their glass transition temperature is substantially unaltered in comparison with the starting polymers and they are distinguished by their mechanical strength, for example by a high tensile and flexural strength and a high degree of flexibility. They are outstandingly suitable as polyanions for electrically conductive polycations of polyheteroaromatic compounds and polyanilines.

The compositions according to the invention are prepared in a manner known per se, by
a) electrochemically polymerising a heteroaromatic compound or an aniline in an organic, aqueous-organic or aqueous solution in the presence of a polymeric salt according to the invention and then removing the composition from the anode or
b) reacting a heteroaromatic compound or an aniline with an oxidising agent in the presence of a polymeric salt and an inert solvent.

Depending on the reaction conditions, the composition may be obtained in the form of a powder or in the form of a film. Process b) is advantageously used for the preparation of a pulverulent material and process stage a) is expediently used for the preparation of a material in the form of a film.

Suitable oxidising agents are, for example, peroxides and persulfates, especially $H_2O_2$, $K_2S_2O_8$ and $(NH_4)_2S_2O_8$, 1 and also iron(III) compounds and copper(II) compounds, especially $FeCl_3$ and $CuCl_2$.

The electrolysis can be carried out potentiostatically or galvanostatically. Suitable anode materials are, for example, inert metals (titanium, nickel, platinum, steel) or ITO glass, or also non-inert metals, such as, for example, aluminium (see DE-A-3 906 563). The current density may be, for example, from 0.5 to 50, preferably from 2 to 50 and especially preferably from 2 to 20, $mA/cm^2$. Brush electrodes are also suitable anode material.

The concentration of polymeric salts may be from 0.05 to 1 mol/l, preferably from 0.01 to 0.5 mol/l, based on the reaction mixture. The concentration of heteroaromatic compound or an aniline may be from 0.0 1 to 10% by volume, especially from 0.1 to 5 % by volume, based on the volume of the reaction mixture.

Suitable organic solvents have been mentioned above. Preferred solvents are alcohols, for example alkanols having from 1 to 12 carbon atoms that may be substituted by $C_1$–$C_4$-alkoxy. Examples are methanol, ethanol, n- and iso-propanol, n-, iso- and tert-butanol, pentanol, hexanol, heptanol, octanol, decanol, dodecanol, methoxyethanol, ethoxyethanol, diethylene glycol monomethyl or monoethyl ether, and 1-methoxypropan-2- or -3-ol.

The formation of pulverulent deposits on the electrode can be determined by the electrolysis conditions and especially by the choice of solvent. The presence of polar protic solvents on their own or in admixture with polar solvents promotes the formation of powders.

A preferred form of the process comprises carrying out the polymerisation in the presence of a polar protic solvent, preferably in the presence of alcohols, $M^\oplus$ being an ammonium cation having at least one organic group. $M^\oplus$ is in this case especially $R_{13}R_{14}R_{15}R_{16}N^\oplus$ wherein each of $R_{13}$ to $R_{16}$, independently of the others, is $C_1$–$C_{18}$alkyl that is unsubstituted or hydroxy-substituted, phenyl, ($C_1$–$C_{12}$alkyl)phenyl, ($C_1$–$C_{12}$alkyl)-benzyl, $C_5$–$C_7$cycloalkyl or ($C_1$–$C_{12}$alkyl)-$C_5$–$C_7$cycloalkyl, or $R_{13}$ and $R_{14}$ together are tetramethylene, pentamethylene or 3-oxapentylene and $R_{15}$ and $R_{16}$ are as defined above. $R_{13}$ to $R_{16}$ are in this case especially $C_1$–$C_6$alkyl, for example methyl, ethyl, n-propyl and, preferably, n-butyl.

If the reactants are sufficiently soluble, the electrochemical polymerisation can be carried out also in water or aqueous-organic solution. The concomitant use of buffers is advantageous. Suitable buffers are, for example, alkylammonium phosphates having in the ammonium group from 1 to 3, especially 2 or 3, alkyl radicals that may contain from 1 to 6, especially from 1 to 4, carbon atoms. Examples are trimethyl-, triethyl-, tri-n-propyl- and tri-n-butyl-ammonium phosphate. Suitable buffers are also cation exchangers in their protonated forms.

It is also possible to add to the reaction mixture other substances that are deposited on the anode at the same time, for example anionic plasticisers or anionic dyes.

When electrolysis is complete, the compositions according to the invention can be detached from the anode in the form of pulverulent deposits or films and purified by washing with solvents. The particle sizes of the powder may be, for example, from 1 to 5000 μm, preferably from 10 to 3000 μm. The particles are in various forms, depending on the electrolysis conditions. They may be in the form of, possibly coalesced, dendrites, needles, rods, fibres or drop-like particles. The films may have a thickness of from 5 μm to 0.3 cm, preferably from 10 μm to 0.1 cm.

The oxidation with iron(III) compounds can be carried out, for example, at temperatures of from $-20°$ C. to $60°$ C., preferably from $0°$ C. to $40°$ C. Suitable solvents have been mentioned hereinbefore in connection with the preparation of the polymeric salts. If the iron(III) compounds, for example iron salts, are insoluble in organic solvents, it is advantageous to use water-soluble solvents in admixture with water. Suitable water-soluble solvents are especially $C_1$-$C_{12}$alkanols, preferably $C_1$-$C_4$alkanols, which may be substituted by $C_1$-$C_4$alkoxy. Examples of alkanols have been mentioned above.

Suitable iron(III) compounds are, for example, iron(III) complexes or complex salts or especially iron(III) salts of inorganic and organic acids, such as, for example, HCl, HBr, HI, $H_2SO_4$, $HClO_4$, $HNO_3$, $FSO_3H$, $CF_3SO_3H$, acetic acid and propionic acid. Iron(III) halides, especially iron(III chloride, are preferred. In addition to Fe(III) salts, other oxidising agents, such as ammonium peroxodisulfate and Cu(II) salts, may also be used.

The chemical oxidation method is described, for example, in Bull. Chem. Soc. Jpn. 62, pp. 234–238 (1989). The reaction proceeds rapidly and the desired products are precipitated in the form of black powders which can be isolated by filtration and purified by washing with, for example, water, NaOH or both agents. If the powders contain ionic chloride, the latter can be removed by treating the powders with chlorosulfonic acid and then washing with water. The grain size of the powder particles is, for example, from 0.1 μm to 100 μm, preferably from 1 μm to 10 μm.

Instead of using aniline in the chemical oxidation, it is also possible to use the corresponding optionally semi-oxidised polyphenyleneamine, for example poly(p-phenyleneamine-imine).

When iron(III) salts are used, the powders have a low content of anions from the oxidising agent, even in the case of a large excess of iron(III) salts in comparison with anionic groups in the polyelectrolyte.

The compositions according to the invention are black free-flowing and electrically conductive powders or films, with glass transition temperatures of up to approximately $200°$ C. or more, that have thermoplastic properties and from which moulded articles of any three-dimensional shape can be produced in accordance with known moulding processes including injection moulding under pressure. The films can also be processed in accordance with stretching processes, for example deep-drawing. The mechanical properties of films produced from the compositions according to the invention can be further improved by stretching in the region of the glass transition temperatures. The invention relates also to the use of the compositions according to the invention in the production of electrically conductive moulded articles, for example rods, plates, housings and other mouldings, which can be used for shielding electromagnetic fields or as electrodes.

The compositions according to the invention in the form of powders may be used as moulding materials. The moulding materials can be processed at low temperatures to form sintered articles which may be porous. When high pressure and relatively high temperatures, for example from below the decomposition temperatures up to the region of the glass transition temperatures, preferably from $60°$ C. to $150°$ C., are used the moulding materials are surprisingly free-flowing. Such processing conditions yield compact moulded articles having smooth surfaces and good mechanical properties, for example flexural strength, fracture strength, tensile strength, flexibility and toughness.

The moulded articles produced from the compositions according to the invention have high electrical conductivities which, in the case of polyheteroaromatic compounds, are generally more than 0.1 S/cm. The conductivity can be influenced by tempering in the case of moulded articles or by the pressure and/or the temperature during moulding processes, or by stretching in the case of films. When films are stretched in the region of the glass transition temperature, the electrical conductivity is surprisingly substantially increased. The compositions according to the invention also have valuable mechanical properties.

The moulded articles and films produced from compositions according to the invention can be used, for example, as electrical conductors, electrodes, cathodes for batteries, electromagnetic shielding materials, electrically conductive rods, sensors, antistatic packaging material or electrically conductive sealing material.

The pulverulent compositions can also be incorporated into polymers as electrically conductive fillers, for example in amounts of from 0.1 to 90% by weight, preferably from 5 to 80% by weight, based on the plastics material. Suitable plastics, for example from the field of thermosetting plastics, thermoplastics and structurally cross-linked polymers, and methods of incorporation and the use of, for example, processing auxiliaries, other fillers, dyes and stabilisers, are familiar to the person skilled in the art. The invention relates also to the use of the pulverulent moulding materials as electrically conductive fillers for plastics. Depending on the amount of electrically conductive filler, moulded articles produced from these filled plastics can be used, for example, as electrical conductors or as components for shielding electrical and magnetic fields. The invention relates further to the use of the pulverulent composition according to the invention as a filler for natural and synthetic plastics.

The invention relates also to a composition comprising
 a) a thermoplastic, thermosetting or structurally cross-linked polymer into which is incorporated
 b) an electrically conductive fine-particled filler formed from a pulverulent composition according to the invention.

The amount of component b) may be from 0.1 to 90% by weight, preferably from 5 to 80% by weight, based on component a). If the amount is up to approximately 20% by weight, electrical conductivities are obtained that are suitable, for example, for rendering material antistatic and for the shielding of electrical fields. High electrical conductivities and moulded articles suitable, for example, as electrical conductors are obtained if the amounts added are more than 20% by weight, preferably at least 30% by weight.

Suitable plastics are, for example:

1. Polymers of mono- and di-olefins, for example polypropylene, polyisobutylene, polybutene-1, polymethylpentene-1, polyisoprene or polybutadiene an polymers of cycloolefins, such as, for example, of cyclopentene or norbornene; also polyethylene (which may optionally be cross-linked), for example high-density polyethylene (HDPE), low-density polyethylene (LDPE), linear low-density polyethylene (LLDPE).
2. Mixtures of the polymers mentioned under 1 ), for example mixtures of polypropylene and polyisobutylene, polypropylene and polyethylene (for example PP/HDPE, PP/LDPE) and mixtures of different types of polyethylene (for example LDPE/HDPE).
3. Copolymers of mono- and di-olefins with one another or with other vinyl monomers, such as, for example, ethylene-propylene copolymers, linear low-density polyethylene (LLDPE) and mixtures of the same with low-density polyethylene (LDPE), propylene-butene-1 copolymers, propylene-isobutylene copolymers, ethylene-butene-1 copolymers, ethylene-hexene copolymers, ethylene-methylpentene copolymers, ethylene-heptene copolymers, ethylene-octene copolymers, propylene-butadiene copolymers, isobutyleneisoprene copolymers, ethylene-alkyl acrylate copolymers, ethylene-alkyl methacrylate copolymers, ethylene-vinyl acetate copolymers or ethylene-acrylic acid copolymers and the salts thereof (ionomers), and also terpolymers of ethylene with propylene and a diene, such as hexadiene, dicyclopentadiene or ethylidenenorbornene; also mixtures of such copolymers with one another and with polymers mentioned under 1 ), for example polypropylene/ethylene-propylene copolymers, LDPE/ethylene-vinyl acetate copolymers, LDPE/ethylene-acrylic acid copolymers, LLDPE/ethylene-vinyl acetate copolymers and LLDPE/ethylene-acrylic acid copolymers.

3a. Hydrocarbon resins (for example $C_5$–$C_9$) including hydrogenated modifications thereof (for example tackifier resins).

4. Polystyrene, poly(p-methylstyrene), poly($\alpha$-methylstyrene). 5. Copolymers of styrene or $\alpha$-methylstyrene with dienes or acrylic derivatives, such as, for example, styrene-butadiene, styrene-acrylonitrile, styrene-alkyl methacrylate, styrene-butadiene-alkyl acrylate, styrene-maleic acid anhydride, styrene-acrylonitrile-methyl acrylate; mixtures of high impact strength comprising styrene copolymers and another polymer, such as, for example, a polyacrylate, a diene polymer or an ethylene-propylenediene terpolymer; and also block copolymers of styrene, such as, for example, styrene-butadiene-styrene, styrene-isoprene-styrene, styrene-ethylene/butylene-styrene or styrene-ethylene/propylene-styrene.
6. Graft copolymers of styrene or $\alpha$-methylstyrene, such as, for example, styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic acid anhydride on polybutadiene; styrene, acrylonitrile and maleic acid anhydride or maleic acid imide on polybutadiene; styrene and maleic acid imide on polybutadiene, styrene and alkyl acrylates or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, and mixtures thereof with the copolymers mentioned under 5), such as are known, for example, as so-called ABS, MBS, ASA or AES polymers.
7. Halogen-containing polymers, such as, for example, polychloroprene, chlorinated rubber, chlorinated or chlorosulfonated polyethylene, copolymers of ethylene and chlorinated ethylene, epichlorohydrin homo- and co-polymers, especially polymers of halogen-containing vinyl compounds, such as, for example, polyvinyl chloride, polyvinylidene chloride, polyvinyl fluoride, polyvinylidene fluoride; and copolymers thereof, such as vinyl chloride-vinylidene chloride, vinyl chloride-vinyl acetate or vinylidene chloridevinyl acetate.
8. Polymers that are derived from $\alpha\beta$-unsaturated acids and their derivatives, such as polyacrylates and polymethacrylates, polyacrylamides and polyacrylonitriles.
9. Copolymers of the monomers mentioned under 8) with one another or with other unsaturated monomers, such as, for example, acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.
10. Polymers that are derived from unsaturated alcohols and amines or their acyl derivatives or acetals, such as polyvinyl alcohol, polyvinyl acetate, stearate, benzoate or maleate, polyvinylbutyral, polyallyl phthalate, polyallylmelamine; and their copolymers with olefins mentioned in point 1.
11. Homo- and co-polymers of cyclic ethers, such as polyalkylene glycols, polyethylene oxide, polypropylene oxide or their copolymers with bisglycidyl ethers.
12. Polyacetals, such as polyoxymethylene, and also those polyoxymethylenes that comprise comonomers, such as, for example, ethylene oxide; polyacetals that have been modified by thermoplastic polyurethanes, acrylates or MBS.
13. Polyphenylene oxides and sulfides and mixtures thereof with styrene polymers or polyamides.
14. Polyurethanes that are derived from polyethers, polyesters and polybutadienes having terminal hydroxy groups, on the one hand, and aliphatic or aromatic polyisocyanates, on the other, and their precursors.
15. Polyamides and copolyamides that are derived from diamines and dicarboxylic acids and/or from aminocarboxylic acids or the corresponding lactams, such as polyamide 4, polyamide 6, polyamide 6/6, 6/10, 6/9, 6/12 or 4/6, polyamide 11, polyamide 12, aromatic polyamides starting from m-xylylenediamine and adipic acid; polyamides produced from hexamethylenediamine and isophthalic and/or terephthalic acid and, where appropriate, an elastomer as modifier, for example poly-2,4,4- trimethylhexamethyleneterephthalamide and poly-m-phenyleneisophthalamide. Block copolymers of the above-mentioned polyamides with polyolefins, olefin copolymers, ionomers or chemically bonded or grafted elastomers; or with polyethers, such as, for example, with polyethylene glycol, polypropylene glycol or polytetramethylene glycol. Also EPDM- or ABS-modified polyamides or copolyamides; and also polyamides condensed during processing ("RIM polyamide systems").

16. Polyureas, polyimides, polyamide-imides and polybenzimidazoles.
17. Polyesters that are derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, and also block polyether-esters that are derived from polyethers having hydroxy terminal groups; also polyesters modified by polycarbonates or MBS.
18. Polycarbonates and polyester carbonates.
19. Polysulfones, polyether sulfones and polyether ketones.
20. Cross-linked polymers that am derived from aldehydes, on the one hand, and phenols, urea or melamine, on the other, such as phenol-formaldehyde, urea-formaldehyde and melamine-formaldehyde resins.
21. Drying and non-drying alkyd resins.
22. Unsaturated polyester resins that are derived from copolyesters of saturated and unsaturated dicarboxylic acids with polyhydric alcohols, and also vinyl compounds as cross-linking agents, and also their halogen-containing, poorly combustible modifications.
23. Cross-linkable acrylic resins that are derived from substituted acrylic acid esters, such as, for example, from epoxy acrylates, urethane acrylates or polyester acrylates.
24. Alkyd resins, polyester resins and acrylate resins that are cross-linked with melamine resins, urea resins, polyisocyanates or epoxy resins.
25. Cross-linked epoxy resins that are derived from polyepoxides, for example from bis-glycidyl ethers or from cycloaliphatic diepoxides.
26. Natural polymers, such as cellulose, natural rubber, gelatins, and their derivatives chemically modified in a polymer-homologous manner, such as cellulose acetates, propionates and butyrates, or the cellulose ethers, such as methylcellulose; and also colophony resins and derivatives thereof.
27. Mixtures (polyblends) of the above-mentioned polymers, such as, for example, PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO.

Other additives may be incorporated into the composition according to the invention to improve the processing properties, the mechanical, electrical and thermal properties, the surface properties and the light-stability, for example fine-particled fillers, reinforcing fillers, plasticisers, glidants and mould-release agents, tackifiers, anti-oxidants, heat and light stabilisers, pigments and dyes.

This composition according to the invention can be prepared in accordance with processes known in plastics technology, for example by mixing the fine-particled electrically conductive filler with the plastics before, during or after preparation, by plasticising the plastics and mixing with the filler by calendering, kneading, extrusion or injection moulding to produce granules or moulded articles. It is also possible to mix the plastics powder with the filler in the dry state and then to mould the mixture, or to suspend the filler in a plastics solution, subsequently remove the solvent and then to perform the processing operation.

In the case of thermosetting plastics and structurally cross-linked polymers, the fine-particled filler is advantageously added before moulding and before curing or cross-linking, for example by mixing together the plastics components and the filler, it being possible to incorporate the filler into one component beforehand.

This composition according to the invention is a valuable moulding material for the production of antistatic and electrically conductive mouldings of any type, for example rims, foils, bands, fibres, plates, semi-finished products, moulded articles and housings for the purposes already mentioned. The processes customarily used for plastics processing may be employed, for example calendering, injection moulding, transfer moulding, extrusion, deep-drawing, compression and sintering processes.

The fine-particled electrically conductive filler is thermoplastically deformable, especially when processed under pressure and at elevated temperature. Such processing methods are therefore preferred because a relatively high electrical conductivity can generally be achieved therewith. Compatibility with the base polymers can be influenced by the choice of alkylsulfonated polyanion. Polyanions having functional groups, for example hydroxy groups, can lead to cross-linking with corresponding base polymers (for example epoxy resins). The mouldings have, together with good mechanical properties, high and long-lasting electrical conductivities which are generally at least 0.01 S/cm when polyheteroaromatic compounds are used as the polycations. The conductivity can be increased by subsequently tempering the mouldings.

The invention relates also to the use of this composition according to the invention in the production of electrically conductive mouldings.

The following Examples illustrate the invention in more detail. The conductivity is measured in accordance with the four-point method. The tensile strength is measured in accordance with DIN 53 455 and the glass transition temperature ($T_g$) is measured in accordance with Differential Scanning Calorimetry. Percentages are percentages by weight unless otherwise indicated.

A) Preparation Examples for polymers having salt-form sulfonate groups

Example A1

Preparation of a sulfonate-propylated phenoxy resin.
a) 33.4 g of 1,3-propane sultone and 25.4 g of $K_2CO_3$ are added in succession to a solution of 51.2 g of a polyadduct of diglycidyl ether of bisphenol A and bisphenol A (degree of polymerisation 100) in 400 ml of N-methylpyrrolidone (NMP). The mixture is stirred for 3 days at 120° C. After cooling, the reaction mixture is poured into water and the precipitated polymeric potassium salt is isolated by filtration, washed with water and dried in vacuo at 50° C. to give 50.6 g of the potassium salt which has a $T_g$ of 95° C. The degree of substitution is determined by elemental analysis and is 0.2 (20 mol %).

b) 10 ml of 1N aqueous hydrochloric acid are added to a solution of 15.6 g of the polymeric salt according to Example A1 a in 200 ml of dimethylformamide (DMF). The batch is stirred for one hour at 80° C. and then tri-n-butylamine is added dropwise. The mixture is stirred for one day at room temperature and then poured into water, washed with water and dried in vacuo to give 15.4 g of the polymeric potassium salt which has a $T_g$ of 58° C. The degree of substitution is determined by elemental analysis and is 0.16 (16 mol %).

Example A2

Preparation of a sulfonate-propylated phenoxy resin.

22.4 g of 1,3-propane sultone and 43.6 ml of tri-n-butylamine are added in succession to a solution of 34.8 g of a polyadduct of diglycidyl ether of bisphenol A and bisphenol A (degree of polymerisation 100, average molecular weight 26 800) in 200 ml of NMP. The mixture is stirred for 17 hours at 150° C. After cooling, the reaction mixture is poured into water and the precipitated polymeric salt is isolated by filtration, washed with water and dried in vacuo at 50° C. to give 42.0 g of the polymeric tri-n-butylammonium salt which has a $T_g$ of 65° C. The degree of substitution is determined by elemental analysis and is 0.25 (25 mol %).

Example A3

Preparation of a sulfonate-propylated phenoxy resin.

The procedure is as in Example A2 and 20.5 g of polyadduct, 50 ml of NMP, 22.3 g of 1,3-propane sultone and 43.2 ml of tri-n-butylamine are reacted for 47 hours at 150° C. to give 43.3 g of the polymeric tri-n-butylammonium salt which has a $T_g$ of 65° C. The degree of substitution is determined by elemental analysis and is 0.37 (37 mol %).

Example A4

Preparation of a sulfonate-butylated phenoxy resin.

The procedure is as in Example A2 and 20.5 g of polyadduct, 50 ml of NMP, 14.8 g of 1,4-butane sultone and 26.0 ml of tri-n-butylamine are reacted for 24 hours at 160° C. to give 25.6 g of the polymeric tri-n-butylammonium salt which has a $T_g$ of 80° C. The degree of substitution is determined by elemental analysis and is 0.32 (32 mol %).

B) Application Examples

Example B1

11.8 g of the polymeric salt according to Example A1a and 5 ml of pyrrole are dissolved in a mixture of 100 ml of propylene carbonate, 20 ml of 1-methoxy-2-propanol and 1 ml of water. The solution is scavenged with argon and transferred into an electrolysis cell having two rotating nickel electrodes (surface area 32 cm$^2$). After a period of electrolysis of 1.5 hours at a current density of 1 A/cm$^2$, a black film 135 μm thick is peeled off the anode, washed with ethanol and then dried in vacuo at 50° C. The electrical conductivity is 3.9 S/cm, the tensile strength is 48 MPa and the flexural elongation is 12% at room temperature, and the $T_g$ is 75° C. After stretching the film by 110% at 100° C., the electrical conductivity is 8.9 S/cm. The molar ratio of sulfonate groups to pyrrole rings is determined by elemental analysis to be 0.19.

Example B2

The procedure is as in Example B1 except that 7.26 g of the polymer according to Example A2 and only 80 ml of propylene carbonate are used. A black film 147 μm thick is obtained which has an electrical conductivity of 6.8 S/cm, a tensile strength of 62 MPa and a flexural elongation of 5.4%, and the $T_g$ is 63° C. After stretching the film by 81% at 100° C., the electrical conductivity is 14.7 S/cm. The molar ratio of sulfonate groups to pyrrole tings is determined by elemental analysis to be 0.30.

Example B3

The procedure is as in Example B2 except that 5.64 g of the polymer according to Example A3 and only 80 ml of propylene carbonate are used. A black film 107 μm thick is obtained which has an electrical conductivity of 7.7 S/cm, a tensile strength of 55 MPa and a flexural elongation of 12%, and the $T_g$ is 62° C. After stretching the film by 102% at 100° C., the electrical conductivity is 17.4 S/cm. The molar ratio of sulfonate groups to pyrrole rings is determined by elemental analysis to be 0.33.

Example B4

The procedure is as in Example B2 except that 6.17 g of the polymer according to Example A4 and only 80 ml of propylene carbonate are used. A black film 160 μm thick is obtained which has an electrical conductivity of 7.3 S/cm, a tensile strength of 60 MPa and a flexural elongation of 10%, and the $T_g$ is 75° C. After stretching the film by 109% at 100° C., the electrical conductivity is 17.1 S/cm. The molar ratio of sulfonate groups to pyrrole rings is determined by elemental analysis to be 0.33.

Example B5

A solution of 33.9 g of FeCl$_3$ in 200 ml of methoxyethanol is added dropwise at room temperature to a solution of 26.6 g of the polymeric salt according to Example A3 and 5 ml of pyrrole in 100 ml of methoxyethanol. The mixture is then stirred overnight at room temperature. The black precipitate formed is isolated by filtration, washed with water and dried at 50° C. in vacuo to give 14.1 g of black powder. A portion of the powder is compressed to form a pellet 13 mm in diameter. The conductivity is measured in accordance with Van der Pau's method and is found to be $1.53 \cdot 10^{-3}$ S/cm.

What is claimed is:

1. A composition comprising at least two polymers one of which is (a) a polymeric polycation in oxidized form, and the other of which is (b) a polyanion of a film-forming thermoplastic polymer, wherein the polymeric polycation consists of heteroaromatic or aniline repeating structural units, and the polyanion has structural repeating units containing a sulfonate-alkylated alcohol group of the formula

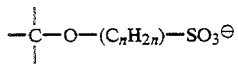

wherein —($C_nH_{2n}$)— is a linear or branched $C_2$–$C_{12}$-alkylene that has from 2 to 5 carbon atoms in the linear carbon chain connecting the O atom and the SO₃ group and is unsubstituted or substituted by $C_1$–$C_4$alkoxy, and wherein there are from 0.1 to 0.9 of the sulfonate-alkylated alcohol groups per structural unit of the polymeric polycation.

2. A composition according to claim 1, wherein the thermoplastic polymer has a salt form wherein the sulfonate-alkylated alcohol groups are salts of the formula,

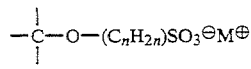

and $M^\oplus$ is an alkali metal cation or an ammonium cation, which salt form has a glass transition temperature of from −100° to 350° C., measured by differential scanning calorimetry.

3. A composition according to claim 1, wherein the polymeric polycation is formed from 5- or 6-membered rings that contain from 1 to 3 hetero atoms from the group O, S and N, and the carbon atoms of which are unsubstituted or substituted by $C_1$–$C_{16}$-alkyl.

4. A composition according to claim 3, wherein the 5- or 6-membered ring is selected from the group consisting of pyrrole, thiophene, furan, 2,2′-bipyrrole, 2,2′-bithiophene, 2,2′-bifuran, thiazole, oxazole, thiadiazole and imidazole.

5. A composition according to claim 3, wherein the polymeric polycation is formed from a pyrrole of the formula

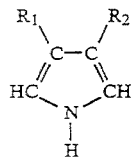

wherein each of $R_1$ and $R_2$, independently of the other, is H, $C_1$–$C_{16}$alkyl or $C_1$–$C_{16}$alkoxy, or $R_1$ and $R_2$ together are tri- or tetra-methylene.

6. A composition according to claim 5, wherein the polymeric polycation is formed from pyrrole.

7. A composition according to claim 1, wherein the polymeric polycation is a polyaniline derived from aniline itself or from aniline substituted in the 3-position by $C_1$–$C_{12}$alkyl or $C_1$–$C_{12}$alkoxy.

8. A composition according to claim 1, which comprises from 0.15 to 0.4 of the sulfonate-alkylated alcohol groups

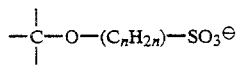

per structural unit of the polymeric polycation.

9. A composition according to claim 1, wherein the group —($C_nH_{2n}$)— is linear or branched $C_3$–$C_8$alkylene having from 3 to 5 carbon atoms in the carbon chain.

10. A composition according to claim 9, wherein the group —($C_nH_{2n}$)— is linear $C_3$–$C_5$-alkylene.

11. A composition according to claim 10, wherein the group —($C_nH_{2n}$)— is ethylene, methylethylene, dimethylethylene, 1,3-propylene, methyl-1,3-propylene, dimethyl-1,3-propylene, trimethyl-1,3-propylene, 1,4-butylene, methyl-1,4-butylene, dimethyl-1,4-butylene, trimethyl-1,4-butylene, tetramethyl-1,4-butylene, 1,3- or 1,5-pentylene and 1,3-, 1,4-, 1,5- or 1,6-hexylene.

12. A composition according to claim 11, wherein the group —($C_nH_{2n}$)— is 1,3-propylene or 1,4-butylene.

13. A composition according to claim 1, wherein the polyanion also contains free alcohol groups and the ratio of free alcohol groups to sulfonate-alkylated alcohol groups

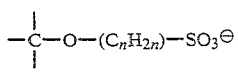

in the polyanion is from 50:1 to 1:50.

14. A composition according to claim 13, wherein the ratio is from 10:1 to 1:10.

15. A composition according to claim 1, wherein the sulfonate-alkylated alcohol groups are bonded in the form of secondary groups

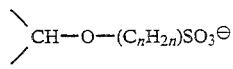

or tertiary groups

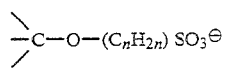

in the polymer backbone; or they are bonded in side groups of he polymer in the form of primary groups —CH₂—O—($C_nH_{2n}$)SO₃$^\ominus$ in the terminal position, or in the form of secondary groups

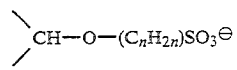

or in the form of tertiary groups

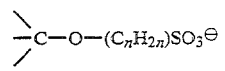

in the middle position.

16. A composition according to claim 1, wherein the thermoplastic polymers are based on polymers containing hydroxy groups or on mixtures thereof selected from the group consisting of polyesters, polyester amides, polyurethanes, polyamides, polycarbonates and polyimides of monomers containing hydroxy groups;

hydrolysed polymers of vinyl esters or vinyl ethers; hydroxylated polydiolefins; polyacrylates or polymethacrylates having hydroxyalkyl radicals in the ester group; polysiloxanes having hydroxyalkyl groups; reduced polyketones or copolymers thereof; polyethers of glycidyl compounds and diols; and also copolymers of vinyl alcohol, or of acrylates or methacrylates containing hydroxyalkyl, or of hydroxylated diolefins with ethylenically unsaturated comonomers.

17. A composition according to claim 16, wherein the polymer is selected from the group consisting of polyadducts of glycidyl compounds having an average of more than one epoxy group and a diol; homo- and copolymers of hydroxyalkyl acrylates or methacrylates; homo- and co-polymers of vinyl alcohol; homo- and co-polymers of butadiene, isoprene and chloroprene, the double bonds of which are completely or partially hydroxylated; polyimides of hydrogenated ketotetracarboxylic acids; hydroxyalkylpolysiloxanes; and polyesters, polyamides, polyurethanes and polyimides of $C_4$-$C_{12}$alkenylene-diols or -diamines, the double bond of which is hydroxylated.

18. A composition according to claim 1, wherein the thermoplastic polymer is an at least partially sulfonate-alkylated polyadduct of a) a glycidyl compound having an average of more than one epoxy group and b) a diol, and the polymer comprises groups

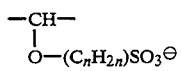

in the polymer chain, wherein the group —$C_nH_{2n}$— is as defined in claim 1.

19. A composition according to claim 1, wherein the polyanion comprises
a) from 100 to 5 mol % of the same or different structural units of formula I

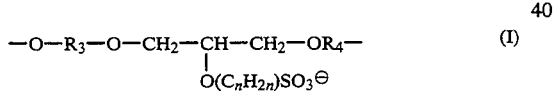

and
b) from 95 to 0 mol % of the same or different structural units of formula II

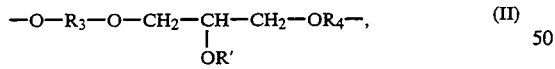

based on the polyanion, wherein each of $R_3$ and $R_4$, independently of the other, is the radical, depleted of two hydroxy groups, of a diol having aliphatic or aromatic diol groups, and R' is H, $C_1$-$C_{20}$alkyl, $C_1$-$C_{20}$acyl, or aminocarbonyl N-substituted by a $C_1$-$C_{20}$hydrocarbon radical.

20. A composition according to claim 19, wherein R' is H.

21. A composition according to claim 19, wherein the polyanion comprises from 90 to 10 mol % of structural units of formula I and from 10 to 90 mol % of structural units of formula II.

22. A composition according to claim 21, wherein the polyanion comprises from 15 to 60 mol % of structural units of formula I and from 85 to 40 mol % of structural units of formula II.

23. A composition according to claim 19, wherein $R_3$ and $R_4$ are identical radicals.

24. A composition according to claim 19, wherein $R_3$ and $R_4$ in the form of aromatic diol radicals contain phenol groups.

25. A composition according to claim 24, wherein each of $R_3$ and $R_4$, independently of the other, is a radical of formula III

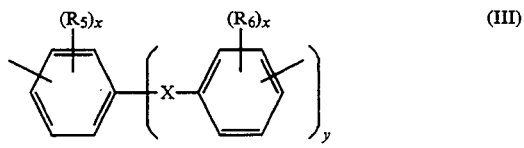

wherein
X is a direct bond, $C_1$-$C_4$alkylene, $C_2$-$C_{12}$alkylidene, $C_5$-$C_8$cycloalkylidene, —O—, —S—, —SO—, —$SO_2$—, —CO—, —$CO_2$—, —N($C_1$-$C_4$alkyl)— or —Si(CH$_3$)$_2$—,
each of $R_5$ and $R_6$, independently of the other, is H, halogen, $C_1$-$C_4$alkyl or $C_1$-$C_4$alkoxy, and
x is 1 or 2 and
y is 0 or 1.

26. A composition according to claim 25, wherein X is a direct bond, methylene, ethylene, $C_2$-$C_6$alkylidene, cyclohexylidene or cyclopentylidene, —O— or —S—.

27. A composition according to claim 25, wherein each of $R_5$ and $R_6$ is H or methyl.

28. A composition according to claim 25, wherein y is 1.

29. A composition according to claim 25, wherein each of $R_3$ and $R_4$ is the radical

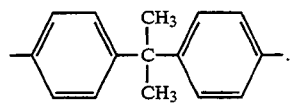

30. A composition according to claim 1, wherein the thermoplastic polymer is a sulfonate-alkylated polymer of a partially hydroxylated polybutadiene, chloroprene or polyisoprene.

31. A composition according to claim 30, wherein the polymer comprises from 5 to 70 mol % of structural units of formula VI

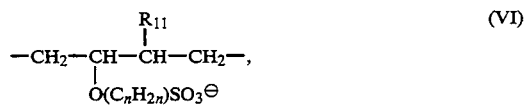

and from 30 to 95 mol % of structural units of formula VIa,

wherein $R_{11}$ is H, OH or Cl and the group —$C_nH_{2n}$— is as defined in claim 1.

32. A composition according to claim 30, wherein the polymer comprises from 5 to 50 mol % of structural units of formula VI and from 95 to 50 mol % of structural units of formula VIa.

33. A composition according to claim 36, wherein $R_{11}$ is H or Cl.

34. A composition comprising a) a thermoplastic, thermosetting or structurally cross-linked polymer into which is incorporated
b) an electrically conductive fine-particled filler formed from a pulverulent composition according to claim 1.

35. A composition according to claim 34, wherein the amount of component b) is from 0.1 to 90% by weight, based on component a).

36. A composition according to claim 35, wherein the amount of component b) is from 5 to 80% by weight.

* * * * *